United States Patent [19]

Tsunekawa et al.

[11] Patent Number: 4,460,836

[45] Date of Patent: Jul. 17, 1984

[54] DEVICE USING SIGNAL INTEGRATION AND STORING TYPE IMAGE SENSING MEANS

[75] Inventors: Tokuichi Tsunekawa, Kanagawa; Kazuya Hosoe; Makoto Masunaga, both of Tokyo, all of Japan

[73] Assignee: Canon Kabushiki Kaisha

[21] Appl. No.: 508,981

[22] Filed: Jun. 27, 1983

Related U.S. Application Data

[63] Continuation of Ser. No. 182,798, Aug. 29, 1980, abandoned.

[30] Foreign Application Priority Data

Sep. 5, 1979 [JP] Japan .................................. 54-114000

[51] Int. Cl.³ .......................... C06Q 4/12; H03K 3/42
[52] U.S. Cl. .................................... 307/311; 307/490; 328/2
[58] Field of Search .......................... 328/2, 127, 128; 307/311, 490; 250/478; 364/837; 340/630

[56] References Cited

U.S. PATENT DOCUMENTS

| 4,087,799 | 4/1978 | Brouwer | 340/630 |
| 4,156,229 | 5/1979 | Shawhan | 328/128 |
| 4,160,922 | 7/1979 | Rickenbacker | 328/128 |

Primary Examiner—Stanley D. Miller
Assistant Examiner—B. P. Davis
Attorney, Agent, or Firm—Toren, McGeady and Stanger

[57] ABSTRACT

A device using signal integration and storing type image sensing means having the functions of generating an electrical signal corresponding to the integrated amount of incident light, storing it, and putting out said stored signal in time-sequential or -seriated manner. This device is provided with control means for controlling the signal integrating and storing operation of said image sensing means. The control means is arranged to control the signal integration and storing operation of the sensing means so that the signal integrating and storing cycle of the image sensing means is made equal to an integer multiple of about 50 mm sec.

5 Claims, 7 Drawing Figures

DEVICE USING SIGNAL INTEGRATION AND STORING TYPE IMAGE SENSING MEANS

This is a continuation of application Ser. No. 182,798, filed Aug. 29, 1980, now abandoned.

BACKGROUND OF THE INVENTION

1. Field of the Invention

This invention relates to a device using signal integration and storing type image sensing means having the functions of generating an electrical signal corresponding to the integrated amount of incident light, storing this signal and putting out the stored signal in time-sequential or -seriated manner.

2. Description of the Prior Art

Recently, MOS photo-diode array (MOS image sensor), CCD photo-sensor, BBD photo-sensor, or other like solid state image sensing devices have found application in many fields of art for various purposes. This kind of solid state image sensing device has an array of a great number of photo-sensitive sensing elements and generates an electrical signal corresponding to the integrated amount of incident light, to store this signal and to put out the stored signal in time-sequential or -seriated manner. It is, further, what is a so-called signal integration and storing type image sensing device.

Since this type of solid state image sensing device has the characteristics providing an output signal with its level linearly proportional to the luminosity on its image receiving surface, it is found that its dynamic range is very narrow. In order to insure that the output signal is always excellent for a wide range of variation of luminosity, various devices must be made. For example, a variable diaphragm aperture or the like is positioned in front of the image receiving surface, and the size of the diaphragm aperture is adjusted in accordance with the brightness of incidence light so that the amount of light incident upon said surface is controlled so as to be constant with the result that all the output signals are acceptable. Otherwise, the signal integration time of said solid state image sensing device may be controlled in accordance with the brightness of incident light to produce an output signal which takes an acceptable level at any time.

By the way, those systems using a solid state image sensing device which employ the latter method wherein said solid state image sensing device can be read out while the output signal is always maintained at an acceptable level by controlling the signal integration time are disclosed in, for example, in German patent application Laid-Open Publication DT-OS Nos. 28 00 448, 28 00 450, 28 10 495, 28 42 348 all assigned to the assignee of the present invention.

Now, with the use of the latter method or the like wherein, in order to always obtain excellent signals from the solid state image sensing device, the signal integration time is controlled in accordance with the incident light brightness, when the incident light is of very high brightness, it is evident that the signal integration time is extremely shortened. In this case, as the incident light brightness varies, the following problem arises. That is, now, for example, suppose an object illuminated with an artificial light source having a flicker effect such as a fluorescent lamp energized by the AC source is imaged, then when the image is scanned with the selection of a very short integration time and at a random repetition, it is required that the integration time of the signal for every cycle be synchronized with the periodic variation of illumination, otherwise the level of the output signal obtained in each cycle would be caused to vary from cycle to cycle. For example, as the object is illuminated with an artificial light source flickering at a frequency of 100 Hz resulting from the power supply from a 50 Hz AC source, when the image of the object is repeatedly scanned for very short signal integration times on the order of 2 msec., it follows that since the period of energization and de-energization of the artificial light source is, at this time, 1/100 sec. = 10 msec., if the integration time of the signal for every repetition of cycle is not in synchronism with the periodic variation of the illumination so as to always establish a predetermined timed relationship to the phase of variation of the illumination, the output signal will take a level which varies at random each time the scanning operation is repeated.

Therefore, in a case where the so-called signal integration and storing type image sensing is operated with the selection of signal integration times by taking into account the brightness of the image to allow for excellent scanning signals to always be obtained, it is ardently hoped to achieve further improvements. Such improvements should include the advantage that the above-described drawback arising particularly when the image of the object illuminated with flickering illumination of constant frequency is scanned repeatedly under the setting of a very short signal integration time is eliminated.

SUMMARY OF THE INVENTION

With the foregoing in mind, it is an object of the present invention to provide an improved device using signal integration and storing type image sensing means with an advantage that as the object is illuminated by a light source having a flicker effect for example, the random change of the output signal from the image sensing means which would otherwise result when an image of the object illuminated with such illumination is repeatedly scanned is prevented from occurring. This makes it possible to always obtain stabilized output signals from the image sensing means despite the flickering of the illumination of the light source.

Another object of the present invention is to make it possible to use any illumination light source so long as the flicker frequency of the illumination light source is an even number of times as large as 10 Hz, while nevertheless always stabilized output signals can be obtained from the image sensing means despite the flickering of said illumination device.

In consideration of such object, according to the present invention, for the device using the signal integration and storing type image sensing means, a more advantageous form of said device is proposed such that there is provided a control means for controlling the signal integration and storing operation of said image sensing means, wherein said control means is arranged to control the signal integration and storing operation of said image sensing means in such a manner that the signal integration and storing cycle of said image sensing means is made equal to an integer multiple of about 50 msec.

That is, the background of definition of the time interval to 50 msec. is: Letting the period of flicker be expressed as $t = 1/f$ (sec.) and the number of cycles be denoted by $n'$, for the flicker frequency $f = 20$ $n(Hz)$, there obtains:

$$n'=0.05\ (\text{sec.})/t\ (\text{sec.})=0.05f=n$$

Thus, a solution for the number of cycles n' can be always found in the form of a positive integer. And, the fact that the number of cycles n' is given by the solution of the positive integer means only that each cycle of signal integrating operation of the image sensing means is initiated always in a predetermined timing with respect to a certain phase of the periodic variation of the illumination. As has been mentioned above, therefore, by controlling the signal integration and storing operation of said image sensing means so as to adjust the signal integration and storing cycle to an integer multiple of about 50 milliseconds, it is made possible to obtain always stabilized output signals with the limitation of the noise to a minimum from said image sensing means at least for the illumination device whose flicker freqnency is 20 n(Hz),despite the presence of its flickering. Thus, the above-described problem can be well solved.

It should be pointed out that the phenomenon of variation in the output signal of the image sensing means due to the flickering of the illumination device prominently takes place when the signal integration time is very short, for example, shorter than the flicker period of the illumination device. When the signal integration time is longer than the flicker period of the illumination device, the influence due to the flickering of said illumination device is almost negligible. Because of this, therefore, such control as described above of the signal integration and storing operation of the image sensing means by the above-described control means, that is, such control where the signal integration and storing cycle is made coincident with an integer multiple of about 50 msec. may be rendered operative only when the signal integration time becomes very short. In this connection, according to a preferred embodiment of the present invention to be described more fully later, a more advantageous form of the above-described device is proposed as provided with means for discriminating what signal integration time is to be set for the image sensing means, and for rendering effective such control as described above concerning the signal integration and storing cycle of said image sensing means due to the above-described control means only when a particularly short time is set as the signal integration time.

These and other objects and features of the present invention will become apparent from the following description of embodiments thereof taken in conjunction with the accompanying drawings.

BRIEF DESCRIPTION OF THE DRAWINGS

In the following, by reference to the accompanying drawings, preferred embodiments of the present invention will be described. In the accompanying drawings.

DETAILED DESCRIPTION OF THE PREFERRED EMBODIMENTS

With first reference to FIG. 1, how the improvements of the present invention is reached will be explained. FIG. 1(A) shows a case where the illuminating device, for example, a fluorescent lamp is powered by a 50 Hz AC source, and FIG. 1(B) shows a case where the lamp is powered by a 60 Hz AC source. In the figures, the curves indicated by dashed lines each represent a variation of the voltage supplied, and the curves indicated by solid lines each represent a variation of the luminosity of the lamp energized and de-energized. As shown in FIGS. 1(A) and 1(B), the illumination light flickers at a frequency equal to two times the frequency of the current of the AC source, and therefore, the brightness of the object with this illumination will repeat light and dark at the same frequency. In the case of 50 Hz of FIG. 1(A), the frequency of flickering of the illumination light is 100 Hz, and its one cycle takes a time, that is, period = 1000/100 = 10 milliseconds. Also in the case of 60 Hz of FIG. 1(B), the frequency of flickering of the illumination light is 120 Hz, and its one cycle has a time, that is, period = 1000/120 msec. Here, letting the period of flickering of the illumination be defined by t=1/f (f: the flicker frequency), and solving an equation T=nt for T when f=20 n(Hz), the following value is obtained $$T=n/f=n/20n=0.05\ (\text{sec.})$$

Thus, the T is found to be 50 milliseconds. Then, with T=50 msec. when f=100 Hz, it can be obtained t=10 msec. and therefore n=5 cycles. Similarly when f=120 Hz, it can be obtained t=1000/120 msec. and therefore n=6 cycles. It is to be understood that if T=50 msec. is set forth, not only f=100 Hz, f=120 Hz but also whatever flicker frequencies expressed as f=20 n(Hz) will lead to provide a solution for the n in the form of a positive integer.

Under such premise, and now assuming that the signal integration and storing type image sensing means is used in scanning repeatedly with the selection of a very short signal integration time $t_A$, which is shorter than the flicker time t of the illumination light, then when that signal integration and storing cycle is coincident with T=50 msec. as shown in the figures, the integrated amount of light incident upon the image sensing means at a time point t2 for the time duration $t_A$ is proven to be equal to that when at a time point t4 after 50 msec. from the time point t2 for the same time duration $t_A$ regardless of whether the electrical power source for the illumination device is of 50 Hz, or 60 Hz, as is sensed after the signal is integrated and stored. Therefore, the flickering of the illumination of the light source hardly affects the photoelectric conversion output signals of the image sensing means. It follows that the variation of the output signal due to the flickering of the light source can be prevented. It should be pointed out that the signal integration and storing cycle may take not only 50 msec. but also an integer multiple of 50 msec.

Figure 1:
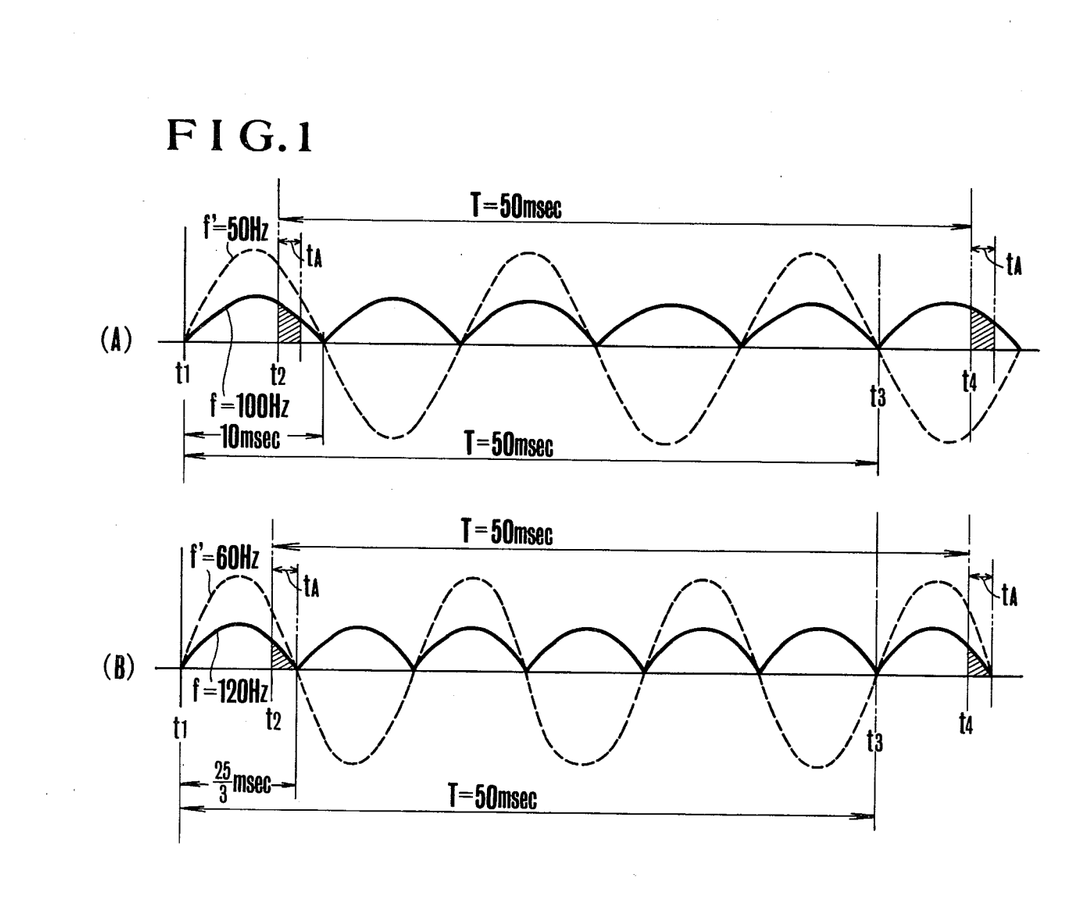
FIG. 1 is a waveform diagram used to explain the improvements of the present invention.

Though the description in connection with FIG. 1 has been conducted for the particular values of the AC frequency f', namely, 50 and 60 Hz, as is evident from the foregoing description, even with other AC frequencies than these ones, in so far as they admit of f' = 10 n (Hz), it is possible that the adjustment of the signal integration and storing cycle to 50 msec., or an integer multiple thereof avoids a variation of the output signal of the image sensing means due to the flickering of the illumination light when the illumination device is driven by said AC source.

Figure 2:
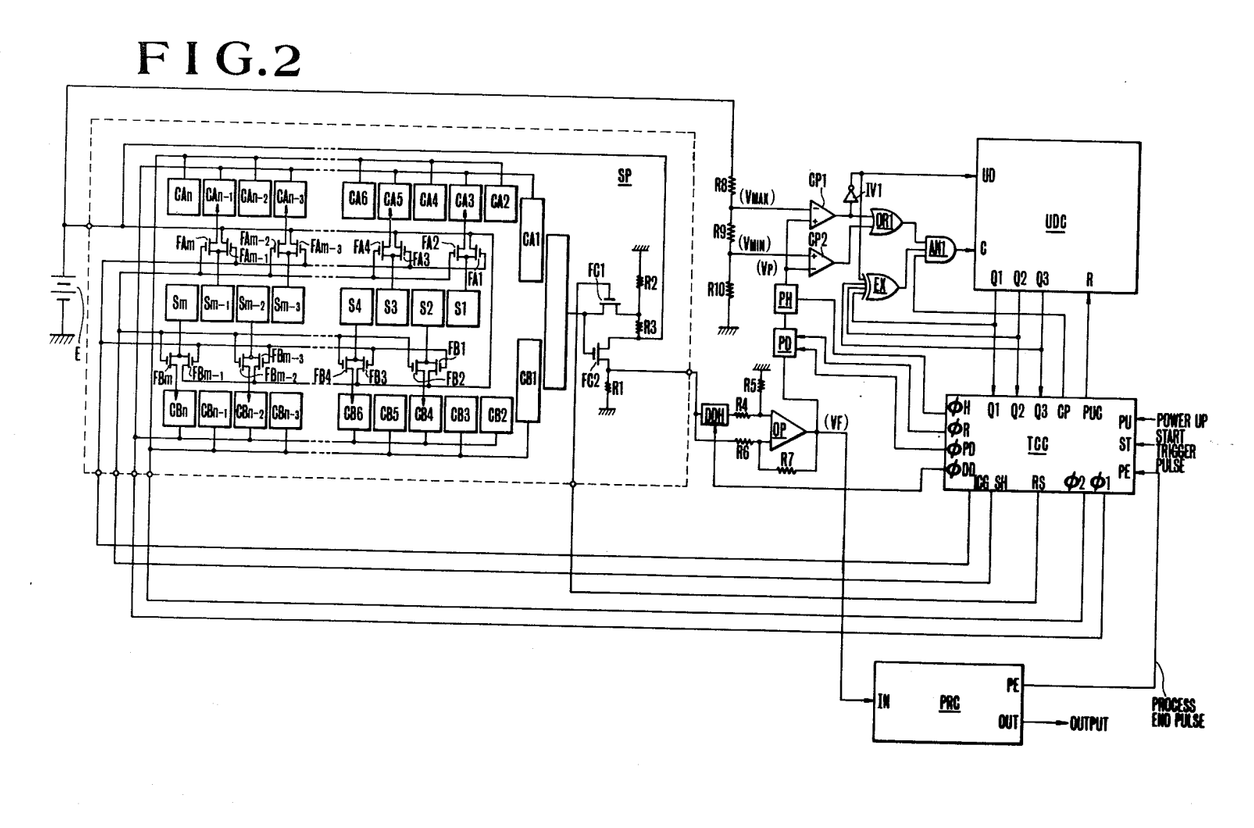
FIG. 2 is an electrical circuit diagram showing one embodiment of the present invention.

Next, explanation is given with respect to an embodiment of the present invention by reference to FIG. 2. In this figure, SP is a solid state image sensing device such as a CCD photo-diode array as the above-described signal integration and storing type image sensing means. S1-Sm are m number of photosensitive elements in a linear array, each having a charge storing function FA1, FA3, ..., FAm−3, FAm−1, and FB1, FB3, ..., FBm−3, FBm−1 are integration clear gates for clearing off the stored charges in the photosensitive elements S1-Sm. FA2, FA4, ..., FAm−2, FAm and FB2, FB4, ..., FBm−2, FBm are charge transfer gates for transferring the charges stored in the photosensitive elements S1-Sm with their magnitude corresponding to the amounts of light integrated thereon to analogue shift registers CA1-CAn and CB1-CBn at bits CA3, CA5, ..., CAn−3, CAn−1, and CB4, CB6, ..., CBn−2, CBn thereof. The output charges from the analogue shift registers CA1-CAn and CB1-CBn pass through a charge-voltage converter circuit comprising resistors R1, R2 and R3, an FET (Field Effect Transistor), FC1, FC2 to an outlet at which it appears as voltage information.

DDH is a dark current detecting and holding circuit for detecting and holding those of the outputs of the solid state image sensing device SP which are obtained in the early reading out stage thereof with exclusion of the signals from the photosensitive elements S1-Sm and therefore which represent a noise signal generated in the interior of the analogue shift registers CA and CB themselves, as the dark current component of said image sensing device. It is to be noted that, for said dark current signal detecting and holding circuit DDH, use may be made of a known sample and hold circuit.

Resistors R4, R5, R6 and R7 and an operational amplifier OP constitute a differential amplifier circuit functioning as a differential circuit for dark current compensation. This differential circuit provides a true image information by subtracting the dark current signal component held by the above-described dark current signal detecting and holding circuit DDH from the image information obtained by the photosensitive elements S1-Sm including the dark current component.

Figure 3:
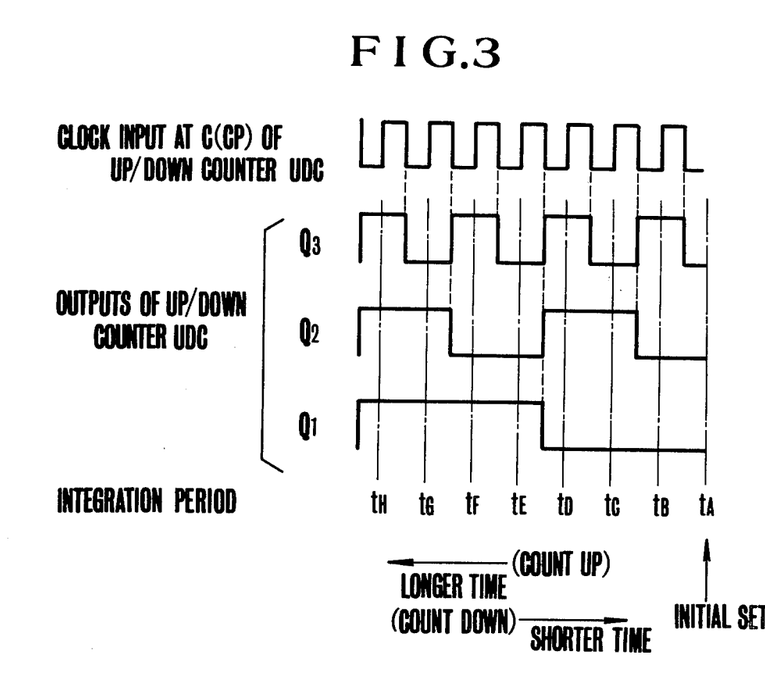
FIG. 3 is a diagram showing a relationship between the outputs of a signal integration time setting UP-/DOWN counter in the circuit system of FIG. 2 and the signal integration times specified thereby.

PD is a peak detecting circuit for detecting a peak value (hereinafter abbreviated to VP) of the output VF of said differential amplifier circuit (OP) which corresponds to the photosensitive elements S1-Sm; PH is a peak hold circuit for holding the peak value VP detected by said peak detecting circuit PD. (For said peak hold circuit PH use may be made of a known sample and hold circuit). R8, R9 and R10 are voltage dividing resistors for providing certain upper and lower reference voltages $V_{MAX}$ and $V_{MIN}$. CP1 is a comparator for comparing the peak value VP held in the peak hold circuit PH with the upper reference voltage $V_{MAX}$ and upon $VP > V_{MAX}$ produces a signal of high level and upon $VP < V_{MAX}$ produces a signal of low level. CP2 is a comparator for comparing the held peak value VP with the lower reference voltage $V_{MIN}$ and upon $VP < V_{MIN}$ produces a signal of high level and upon $VP \geq V_{MIN}$ produces a signal of low level. $IV_1$ is an inverter for inverting the output of the comparator CP1, its output being applied as a count mode control signal for a signal integration time setting UP/DOWN counter UDC (in this instance, in the form of a 3-bit binary UP/DOWN counter) to said UP/DOWN counter UDC. By the way, said UP/DOWN counter UDC is arranged so that when the output of the inverter $IV_1$ takes a high level, the UP count mode goes on, and when it takes low level, the DOWN count mode is begun. OR1 is an OR gate for taking the logic sum of the output of the comparator CP1 and the output of the comparator CP2; EX is an exclusive OR gate for taking the exclusive logic sum of the three bit outputs Q1, Q2, Q3 of the UP/DOWN counter UDC and the output of the inverter $IV_1$; $AN_1$ is an AND gate for taking the logic product of the output of said OR gate OR1, the output of the exclusive OR gate EX and the clock pulses CP from a timing control circuit TCC to be described later, its output being applied as a count clock to said UP/DOWN counter UDC. It is to be noted that the exclusive OR gate EX is provided in order that with the signal integration time set either at the shortest time $t_A$, or at the longest time $t_H$ (see FIG. 3) when an information representing the shift beyond one of these limits is given by the comparator CP1 or CP2, the UP/DOWN counter UDC is prevented from resetting, whereby the signal integration time is left unchanged from or fixed in the precedingly set shortest or longest time. By the way, the relationship between the 3-bit outputs Q1 to Q3 of the UP/DOWN counter UDC and the above-described 8-stepped signal integration times $t_A$ to $t_H$ is shown in FIG. 3.

Figure 4:
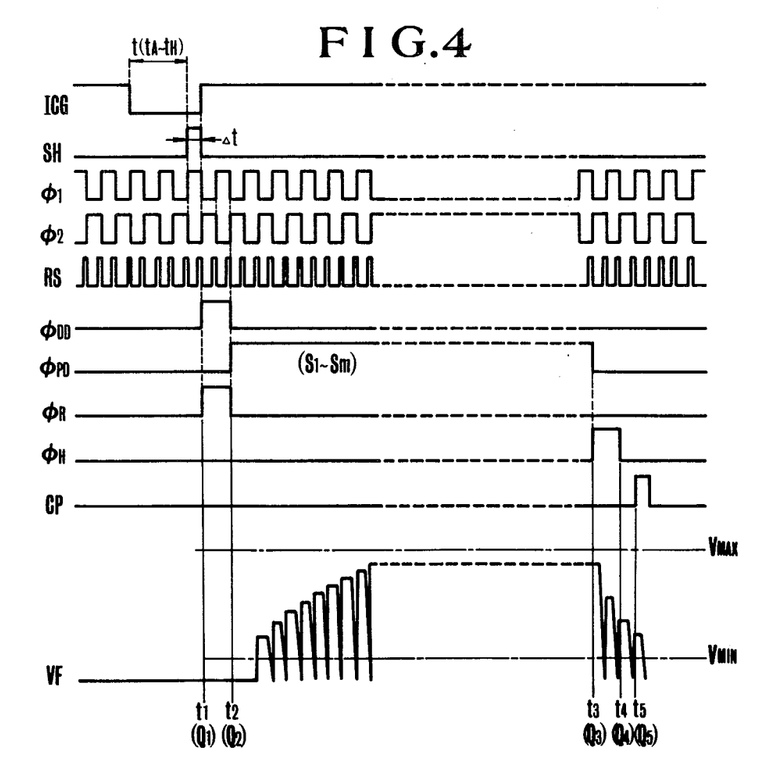
FIG. 4 is a timing chart showing a manner in which the circuit system of FIG. 2 operates.

TCC is a timing control circuit for producing various control pulses and control signals according to the timing chart of FIG. 4. PUC is a reset pulse occurring when the electrical power source is turned on and directed to the UP/DOWN counter UDC to initially set the signal integration time of the solid state image sensing device SP to the shortest integration time $t_A$; CP is a count control pulse for the UP/DOWN counter UDC occurring once each time the signal of the solid state image sensing device SP is read out (that is, signal integration time control pulse: $\phi_{DD}$ is a dark current signal detection control signal for said dark current signal detecting and holding circuit DDH for causing the dark current signal detecting and holding circuit DDH to detect the dark current signal and hold it for every one cycle of read out; $\phi_{PD}$ is a peak detection control signal for said peak detecting circuit PD for causing the peak detecting circuit PD to detect the peak value $V_P$ of those signals of the output VF of the above-described differential amplifier circuit (OP) which corresponds to the above-described photosensitive elements S1-Sm for every one cycle of read out; $\phi_R$ is a peak reset control signal for resetting the peak detecting circuit PD, for example, just after the initiation of each cycle of read out; $\phi_H$ is a peak hold control signal for causing the peak value detected by the peak detecting circuit PD to be held in the peak hold circuit PH each time one cycle of read out is completed and before the resetting of the peak detecting circuit PD; SH is a gate control pulse (shift pulse) for the charge transfer control gates FA2, FA4, ..., FAm−2, FAm and FB2, FB4, ..., FBm−2, FBm in the solid state image sensing device SP; ICG is a gate control signal (integration clear signal) for the integration clear control gates FA1, FA3, ..., FAm−3, FAm−1 and FB1, FB3, ..., FBm−3, FBm−1 in the same device; $\phi 1$, $\phi 2$ are transfer clock pulses for the charge transfer analogue shift registers CA and CB (that is, here the analogue shift registers CA and CB are of the two-phase drive type, and also here the shift pulse SH is $\phi 1$-synchronous); RS is a reset pulse for the FET FC1 in the charge-voltage converter circuit.

It is noted that said timing control circuit TCC governs the signal integration time control function of the solid state image sensing device SP based on the time information indicated by the outputs Q1, Q2 and Q3 of the UP/DOWN counter UDC. Specifically, the time interval defined by t in FIG. 4, or from the falling edge of the integration clear signal ICG to the rising edge of the shift pulse SH is controlled in a range of the above-described 8-stepped times $t_A$ to $t_H$, depending upon the combinations of the conditions of the outputs Q1 to Q3 of the UP/DOWN counter UDC, thereby the control of said signal integration time is realized. Therefore, here, the actual signal integration time of the solid state image sensing device SP is determined to be the sum of the above-defined time interval t and the high level duration of the shift pulse SH, or $\Delta t$. Since, as the solid state image sensing device SP is of the two-phase drive type as has been mentioned above, its photosensitive elements S1, S2, ..., Sm are read out in synchronism with $\phi 1$ and $\phi 2$, and its first output is initiated after a while from the application of the shift pulse SH.

PRC is an appropriate signal processing circuit for processing the output VF of the above-described differential amplifier circuit (CP) according to a predetermined scheme to produce output data as is desired. But here it does not directly concern the essential features of the present invention. Hence a detailed description therefor is omitted, except that this signal processing circuit PRC is required particularly in the present invention, to have a function such that each time one cycle of a signal processing operation is completed, a signal processing completion pulse PE can be produced. This signal processing completion pulse PE is applied to the timing control circuit TCC. Based on this signal processing completion pulse PE, the timing control circuit TCC determines the timing of readout of the output from the solid state image sensing device for the next cycle. For such signal processing circuit PRC, taking an example of the above cited DT-OS No. 28 43 348, use may be made of the distance or focus detecting digital signal processing circuit.

Now, with such construction, first when the electrical power source of the system is turned on, at this time, the timing control circuit TCC produces a reset pulse PUC (Power Up Clear Pulse) which is then applied to the UP/DOWN counter UDC, thereby said UP/DOWN counter UDC is reset with its outputs Q1 to Q3 all taking low level. Thus, the indicating signal integration time of the solid state image sensing device SP is set in an initial time that is the shortest time $t_A$ as shown in FIG. 3. On the other hand, such turning on of the electrical power source also causes the timing control circuit TCC to initiate further production of the transfer clock pulses $\phi 1$ and $\phi 2$ and the reset pulse RS which are applied to the solid state image sensing device SP, and further causes the integration clear signal ICG to be changed to high level at which time the integration clear control gates FA1, FA3, ..., FAm−3, FAm−1 and FB1, FB3, ..., FBm−3 FBm−1 are turned on.

Thus, the charges generated in its photosensitive elements S1-Sm are inhibited from storing. Then, when a trigger signal (start trigger pulse) is fed from the outside to said timing control circuit TCC, the timing control circuit TCC responsive to this trigger signal (pulse) immediately changes the integration clear signal ICG to low level as shown in FIG. 4 at which the integration clear gates FA1, FA3, ..., FAm−3, FAm−1 and FB1, FB3, ..., FBm−3, FBm−1 are turned off, thereby depending on the incident light intensity the charges are generated and stored in the photosensitive elements S1-Sm. At the same time, counting of the signal integration time indicated by the outputs Q1 to Q3 of the UP/DOWN counter UDC (that is, in this instance, the shortest time $t_A$) starts. Then, when this counting is terminated, a shift pulse SH is produced. At this time point, therefore, the charge transfer gates FA2, FA4, ..., FAm−2, FAm and FB2, FB4, ..., FBm−2, FBm are turned on, permitting the charges stored in the photosensitive elements S1-Sm during the above-described counting time to be read out through the charge transfer analogue shift registers CA and CB at the respective bits CA3, CA5, ..., CAm−3, CAm−1 and CB4, CB6, ..., CBm−2, CBm. After that, they are transferred to the charge-voltage converter circuit where they are converted to voltages which appear at the outlet. It is to be noted that after the production of the shift pulse SH, the timing control circuit TCC changes the integration clear signal ICG to high level again, and the integration clear gates FA1, FA3, ..., FAm−3, FAm−1 and FB1, FB3, ..., FBm−3, FBm−1 are again turned on to inhibit the storing of the generated charges in the photosensitive elements S1-Sm.

Then, while the solid state image sensing device SP is operated in such a manner to produce scanning signals, the timing control circuit TCC produces the dark current signal detecting control signal $\phi DD$ for the dark current signal detecting and holding circuit DDH which is changed to high level at a time when a signal not including the photo-signals from the photosensitive elements S1-Sm, that is, representing the dark current component is produced, as shown in FIG. 4, thus causing the said dark current signal detecting and holding circuit DDH to detect the dark current component and hold it. Then, the dark current signal of the solid state image sensing device SP as detected and held in said dark current signal detecting and holding circuit DDH is fed to the differential amplifier circuit (OP) at one input thereof. Upon reception of the photo-signals from the photosensitive elements S1-Sm at the other input, said differential amplifier produces signals representing the photo-signals less the above-described dark current signal component, that is, dark current-compensated image information signals VF. On the other hand, at this time, in a period corresponding to the period during which the dark current signal detecting and holding circuit DDH is caused to detect and hold the dark current signal of the solid state image sensing device SP, the timing control circuit TCC renders the peak reset control signal $\phi R$ for the peak detecting circuit PD to change to high level as shown in FIG. 4, thereby said peak detecting circuit PD is reset. And, after that, during the period in which the solid state image sensing device SP produces signals corresponding to the photosensitive elements S1-Sm, the peak detecting control signal $\phi PD$ for the said peak detecting circuit PD is made high, so that said peak detecting circuit PD is caused to detect the peak value $V_P$ of those of the outputs of the differential amplifier circuit (OP) which correspond to the photosensitive elements S1–Sm. And, when the production of the signals corresponding to the photosensitive elements S1–Sm has been completed, at this time point, the timing control circuit TCC changes the peak detecting control signal $\phi$PD to low level as shown in FIG. 4, thereby the detection of the peak value by the peak detecting circuit PD is terminated. After that, the peak hold control signal $\phi$H is applied to the peak hold circuit PH. At this time point, the peak detection output VP of the said peak detecting circuit PD is held. When said peak hold circuit PH holds the peak value VP, the comparators CP1 and CP2 compare said held peak value VP with the upper and lower reference voltages $V_{MAX}$ and $V_{MIN}$, with the comparison result being stepped out as a high or low logic signal. That is, now assuming that, for example, $VP<V_{MIN}$, the output of the comparator CP1 is low, and the output of the comparator CP2 is high. Therefore, the output of the UP/DOWN counter UDC is set to the UP count mode, and the output of the OR gate OR1 is changed to high level. Also, at this time, the output of the exclusive OR gate EX becomes high. Therefore, after the holding of the peak detection output VP of the peak detecting circuit PD by the peak hold circuit PH is terminated, the timing control circuit TCC produces one count pulse CP for the UP/DOWN counter UDC as shown in FIG. 4, and said count pulse CP is applied through the AND gate AN1 to said UP/DOWN counter UDC at the count input thereof, thereby said UP/DOWN counter UDC advances one count. Therefore, its output Q1 to Q3 are in low, low and high conditions respectively, causing the indicated signal integration time of the solid state image sensing device SP to change from the shortest time $t_A$ to the next $t_B$. Therefore, when in the next scanning cycle, the timing control circuit TCC controls the time interval t from the falling to the low level of the integration clear signal ICG to the rising of the shift pulse SH according to the time $t_B$. Thus, the signal integration time of the solid state image sensing device SP is elongated so that the level of the image information signal VF obtained through the above-described differential amplifier circuit (OP) is increased. This signal integration time changing procedure repeats itself until $V_{MIN} \leq VP \leq V_{MAX}$ is established. When $V_{MIN} \leq VP \leq V_{MAX}$ is finally attained, it is at this time point that the outputs of the comparators CP1 and CP2 both are low level, and therefore the output of the OR gate OR1 becomes low. Then, the application of the count pulse CP from the timing control circuit TCC to the UP/DOWN counter UDC is inhibited by the AND gate AN1. Therefore, at this time point, the signal integration time is stopped from further change, and is maintained at this proper value. It is of course possible that if $VP<V_{MIN}$ takes place again during the scanning with said signal integration time, the signal integration time is to be further elongated by a similar procedure to that described above, and also that conversely when $VP>V_{MAX}$ takes place, the output of the comparator CP1 becomes high, and the output of the comparator CP2 becomes low. Then, the output of the inverter IV1 is changed to low level at which the UP/DOWN counter UDC is set to the DOWN count mode and responsive to the count pulse CP from the timing control circuit TCC, it retreats one count, thereby the signal integration time is shortened one step. Thus, such procedure result in the adjustment of the signal integration time of the solid state image sensing device SP to a proper value, that is, such a proper value as to provide an excellent picture information when $V_{MIN} \leq VP \leq V_{MAX}$.

It should be pointed out that though it is natural that if the initially set shortest time $t_A$ coincides with the proper signal integration time found, that is, such signal integration time as to satisfy $V_{MIN} \leq VP \leq V_{MAX}$, the actual signal integration time is maintained at this value $t_A$, it is on the other hand proven that, for example, as the incident light luminosity is very high, therefore, even when $VP>V_{MAX}$ takes place under the setting of this shortest time $t_A$, this situation will lead to change the output of the comparator CP1 to high level, and therefore, the output of the inverter IV1 to the low level, while, because of all the outputs Q1 to Q3 of the UP/DOWN counter UDC taking low level, the output of the exclusive OR gate EX also becomes low. Thus, the signal integration time is not changed, and remains unchanged from said shortest time $t_A$. It is also proven that conversely as the incident light luminosity is very low, therefore, even when $VP<V_{MIN}$ takes place under the setting of the signal integration time at the longest value $t_H$, this situation will lead to change the output of the comparator CP1 to low level and therefore the output of the inverter IN1 to the high level, and to change the output of the comparator CP2 to high level, while, because of the outputs Q1–Q3 of the UP/DOWN counter UDC all being of high level, the output of the exclusive OR gate EX becomes low. Thus, the signal integration time is no longer changed and remained fixed at the longest one $t_H$.

Now, in this circuit system of FIG. 2, such operation as described above is performed under the control by the timing control circuit TCC. Here, said timing control circuit TCC, as has already mentioned, when to repeatedly read out the outputs from the solid state image sensing device SP, controls its signal integration and storing operation so that the time interval of a signal integration and storing operation of said solid state image sensing device SP is made equal to 50 msec. or an integer multiple of it.

Next explanation is given to the details of the timing control circuit TCC having such functions as described above by reference to FIG. 5.

Figure 5:
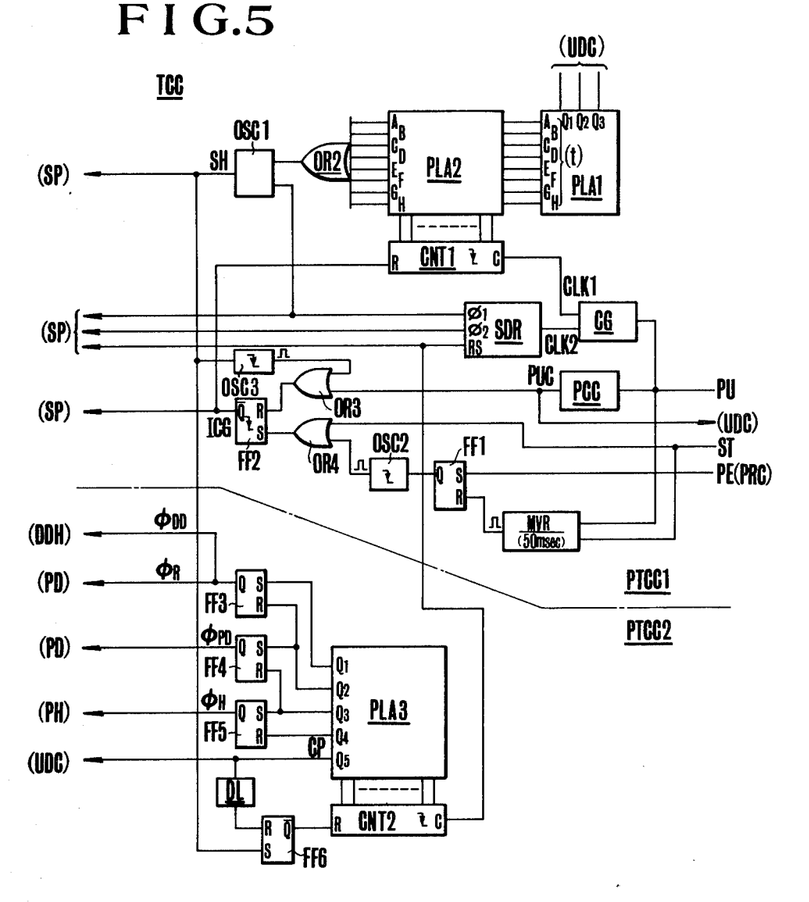
FIG. 5 is a circuit diagram, partly in block form, of a timing control circuit in the circuit system of FIG. 2.

In the figure, CG is a clock generator responsive to turning on of the electrical power source (power up) for producing two trains of clock pulses CLK1 and CLK2 with predetermined frequencies different from each other; SDR is a two-phase drive type sensor driver known in the art capable, on the basis of the clock pulses CLK2 from the clock generator CG, of forming such transfer clock pulses $\phi$1 and $\phi$2 and reset pulse RS as shown in FIG. 4. And, they are applied to the analogue shift registers CA, CB in the solid state image sensing device SP and to the FET FC1 in the charge-voltage converter circuit as has been mentioned above.

PLA1 is a programmable logic array whose content is previously programmed so that the outputs Q1–Q3 of the UP/DOWN counter UDC are converted to signal integration time specifying signals A to H corresponding to the combinations of the outputs Q1–Q3 according to the relationship between said outputs Q1–Q3 and the indicated signal integration times $t_A$–$t_H$ shown in FIG. 3; CNT1 is an integration time counter adapted to perform counting of the signal integration time and here arranged to count the clock pulses CLK1 from the clock generator CG only when the integration clear signal ICG is low level, and to be held in the reset condition when in the other time. PLA2 is a programmable logic array whose content is previously programmed so that at a point in time when the counted value of said counter CNT1 has reached the prescribed value by the integration time specifying signal from the programmable logic array PLA1, either one of its outputs A to H (these outputs A–H correspond to the integration times $t_A$–$t_H$ respectively), that is, the one which corresponds to the specified integration time is changed to high level; OR2 is an OR gate for taking the logic sum of the outputs A–H of said programmable logic array PLA2; OSC1 is a one-shot circuit (multi-vibrator) receptive of the output of said OR gate OR2 and the transfer pulses $\phi 1$ from the sensor driver SDR and responsive to the transfer clock pulse $\phi 1$ just after the output of the OR gate OR2 changes from low to high level for producing a shift pulse SH in synchronism therewith as shown in FIG. 4, the shift pulse SH produced from said one-shot circuit OSC1 being applied to the charge transfer gates FA2, FA4, . . . ,FAm−2, FAm and FB2, FB4, . . . ,FBm−2, FB of the solid state image sensing device SP as has been mentioned above.

PCC is a power up clear circuit responsive to turning on of the electrical power source (power up) for producing a power up clear pulse PUC. The power up clear pulse PUC produced from said power up clear circuit PCC is applied to the reset input R of the UP/DOWN counter UDC, and this causes said UP/DOWN counter UDC to be reset as has been mentioned above. (As a result, as has been mentioned above, the indicated integration time is initially set to the shortest value $t_A$).

MVR is a multivibrator constituting a fundamental element for controlling the time interval of a signal integration and storing operation of the solid state image sensing device SP to 50 msec. or an integer multiple thereof. Here it is arranged so that with the electrical power source turned on, it starts to generate pulse signals with cycle of 50 msec. in response to the start trigger pulse ST. FF1 is an RS flip-flop arranged to be set by the signal processing termination pulse PE from the signal processing circuit PRC and on the other hand to be reset by the output pulse of the multi-vibrator MVR; OSC2 is a one-shot circuit (multi-vibrator) responsive to the change of the Q output of the said flip-flop FF1 from high to low level for producing a pulse single; OR4 is an OR gate for taking the logic sum of the output pulse of said one-shot circuit OSC2 and the start trigger pulse ST; OSC3 is a one-shot circuit (multivibrator) responsive to the falling of said shift pulse SH produced from the one-shot circuit OSC1 for producing a pulse signal; OR3 is an OR gate for taking the logic sum of the pulse signal produced from the one-shot circuit OSC3 and the power up clear pulse PUC produced from the power up clear circuit PCC; FF2 is an RS flip-flop arranged to be set by the output pulse of said OR gate OR4 and on the other hand, to be reset by the output pulse of the OR gate OR3. Here the $\overline{Q}$ output of said flip-flop FF2 serves as the integration clear signal ICG shown in FIG. 4 and as has been mentioned above, is applied to the charge clear gates FA1, FA3, . . . , FAm−3, FAm−1 and FB1, FB3, . . . ,FBm−3, FBm−1. It is to be noted that the $\overline{Q}$ output of said flip-flop FF2 is applied to the reset input R of the integration time counter CNT1 also. Therefore, said counter CNT1 is allowed to operate only during the time period when the integration signal ICG is of low level.

The above parts here constitute the control portion PTCC1 for the solid state image sensing device SP in the timing control circuit TCC. With the control portion PTCC1 of such construction, when the electrical power source is first turned on, the clock generator CG and sensor driver SDR start to operate, and at the same time the power up clear circuit PCC produces the power up clear pulse PUC. And by this as has been mentioned above, the UP/DOWN counter UDC is reset so that the specified integration time is initial-set to the shortest time $t_A$, and on the other hand the flip-flop FF2 is reset through the OR gate OR3 with the change of its $\overline{Q}$ output or integration clear signal ICG to high level. By this, the solid state image sensing device SP is, as has been mentioned above, inhibited from storing of the generated charges on the photosensitive elements S1–Sm thereof, and on the other hand, the integration time counter CNT1 is held in the reset condition. Then, when the start trigger pulse ST is fed, the multivibrator MVR starts to produce a pulse single in each 50 msec. cycle, and on the other hand the flip-flop FF2 is set through the OR gate OR4. Therefore, its $\overline{Q}$ output, that is, the integration clear signal ICG becomes low. By this, the solid state image sensing device SP starts to store the generated charges on the photosensitive elements S1–Sm thereof, that is, a signal integration and storage, and on the other hand the integration time counter CNT1 starts to count the clock pulses CLK1 from the clock generator CG. And, when the counted value of said counter CNT1 reaches the value specified by the output of the programmable logic array PLA1 (in this instance, the output A), it is at this time point that either one of the outputs of the programmable logic array PLA2 (in this instance, output A) becomes high, so that the one-shot circuit OSC1 produces a shift pulse SH in synchronism with the one of the transfer clock pulses $\phi 1$ which occurs just after the output of the OR gate OR2 is changed to high level. By this, the read out of the output from the solid state image sensing device SP starts. And when said shift pulse SH becomes low, the flip-flop FF2 is reset through the OR gate OR3 by the pulse signal produced from the one-shot circuit OSC3. Therefore, the integration clear signal ICG becomes high again, so that the solid state image sensing device SP is inhibited again from storing of the generated charges on the photosensitive elements S1–Sm thereof, and on the other hand the integration time counter CNT1 is also held again in the reset condition.

Now, the output of the solid state image sensing device SP read out at this time, as has been mentioned above, after having been processed for dark current compensation in the differential amplifier circuit (OP) is applied to the signal processing circuit PRC where it is subjected to a suitable signal processing. When the signal processing in said signal processing circuit PRC is terminated, the signal processing termination pulse PE is produced. By this the flip-flop FF1 is set with the change of its Q output to high level. Then when the multivibrator MVR produces a pulse single, said flip-flop FF1 is reset with its Q output changed from high to low level. And, responsive to this change of the Q output of the said flip-flop FF1 from high to low level, the one-shot circuit OSC2 produces a single pulse. By this the flip-flop FF2 is set through the OR gate OR4, and the integration clear signal ICG becomes low. By this the storing of the generated charges in the photosensitive elements S1–Sm of the solid state image sensing device SP, that is the signal integration and storage starts, and at the same time the counting of the integration time is performed.

After that, a similar procedure repeats. Here, as will be understood from the foregoing explanation, in the case where the read out of the output of the solid state image sensing device SP is repeatedly performed, the timing pulse determining the timing of the start of the signal integration and storing operation of said solid state image sensing device SP can be obtained from the one-shot circuit OSC2. And, here, said one-shot circuit OSC2 produces said timing pulse in response to the change of the Q output of flip-flop FF1 from high to low level, and said flip-flop FF1 after having been set by the signal processing termination pulse from the signal processing circuit PRC is reset by the pulse produced from the multi-vibrator MVR with the change of its Q output from high to low level, and further said multi-vibrator MVR starts to produce a pulse signal in each 50 msec. cycle in response to the start trigger pulse ST, that is, in synchronism with the start of the first signal integration and storing operation of the solid state image sensing device SP in the first cycle of output read out. Therefore, when to repeatedly perform the readout of the output of the solid state image sensing device SP, the time interval of the signal integration and storing operation cycle thereof is correctly controlled to 50 msec. or an integer multiple thereof by the operation of the circuit means including the multi-vibrator MVR, flip-flop FF1 and one-shot circuit OSC2 no matter how the signal integration time varies, and no matter how the signal processing time in the signal processing circuit PRC may vary.

Figure 7:
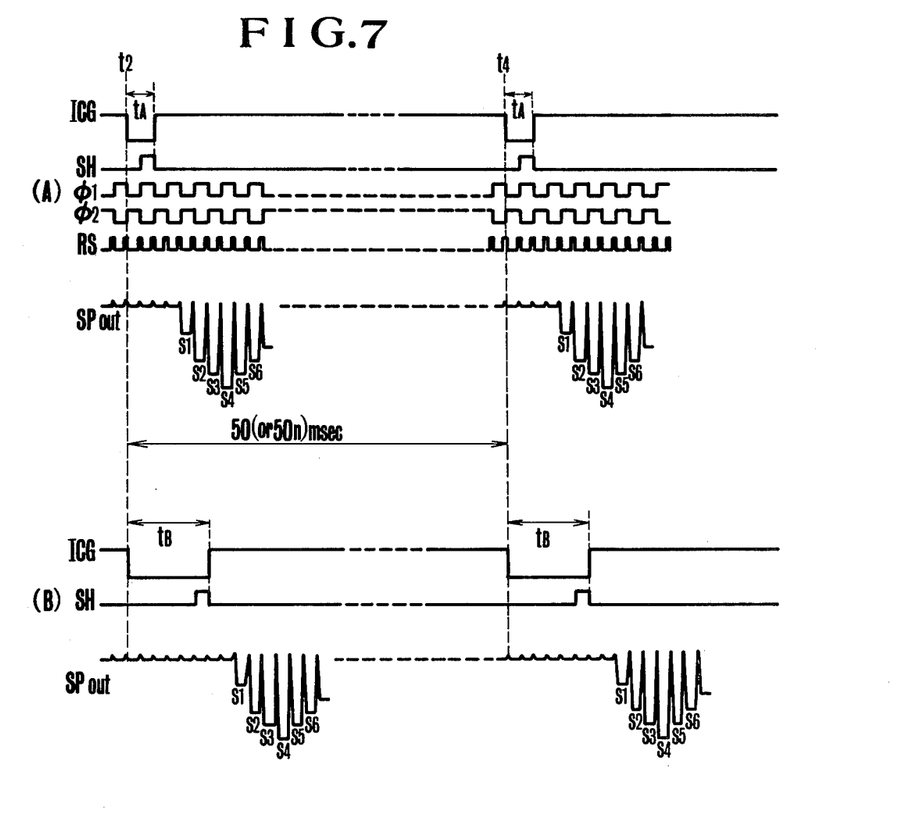
FIG. 7 is a timing chart mainly showing a manner in which the signal integration cycle of the image sensing means is controlled by the timing control circuit.

It is noted that such manner of the control of the solid state image sensing device SP by the control portion PTCC1 is shown in FIG. 7.

Next, CNT2 is a sequence counter adapted to obtain a timing serving as a standard in forming the control signals $\phi$DD, $\phi$R, $\phi$PD, $\phi$H shown in FIG. 4 for the dark current signal detecting and holding circuit DDH, peak detecting circuit PD and peak hold circuit PH, and the count pulse CP for the UP/DOWN counter UDC. Here it is arranged to count the reset pulses RS from the sensor driver SDR in the only period from the time point at which the shift pulse SH is produced to the termination of the output of the count pulse CP, and to be held in the reset condition in the other period. PLA3 is a programmable logic array whose content is previously programmed so that based on the output of said counter CNT2, a timing pulse serving as a standard in forming the above-described control signals $\phi$DD, $\phi$R, $\phi$PD, $\phi$H and the count pulse CP. Here the program is such that when, in reading out the output of the solid state image sensing device SP, a single pulse as the output Q1 is produced just after the production of the shift pulse SH, a single pulse as the output Q2 is produced at a point in time when the production of the signals from the photosensitive elements S1–Sm of the solid state image sensing device SP starts, a single pulse as the output Q3 is produced when the production of the signals from said photosensitive elements S1–Sm is terminated, a single pulse as the output Q4 is produced after a predetermined time has passed from that time, and a single pulse as the output Q5 is produced after a predetermined time has further passed from that time. It is noted that the timing of production of the single pulses from the outputs Q1 to Q5 correspond to the respective time points indicated by t1 to t5 in FIG. 4. FF3 is an RS flip-flop arranged to be set by the change of the output Q1 of the said programmable logic array PLA3 to the high level, and then to be reset by the change of its output Q2 to the high level; FF4 is an RS flip-flop arranged to be set by the change of said output Q2 to high level and then to be reset by the change of the output Q3 to high level; FF5 is an RS flip-flop arranged to be set by the change of the output Q3 to high level and then to be reset by the change of the output Q4 to high level. Here the Q output of the flip-flop FF3 serves as the dark current signal detecting control signal $\phi$DD for the dark current signal detecting and holding circuit DDH and the peak resetting control signal $\phi$R for the peak detecting circuit PD shown in FIG. 4. The Q output of the flip-flop FF4 serves as the peak detecting control signal $\phi$PD for the peak detecting circuit PD. And, the Q output of the flip-flop FF5 serves as the peak hold control signal $\phi$H for the peak hold circuit PH. It is noted that, for count pulse CP for the UP/DOWN counter UDC, use is made of the pulse signal from the output Q5. FF6 is an RS flip-flop arranged to be set by the change of the shift pulse SH to high level and then to be reset by the change of the output of a delay circuit DL to high level which delays the above-described output Q5 by a predetermined time. Its $\overline{Q}$ output is applied to the reset input R of the counter CUT2. Therefore, by this said counter CNT2 as has been mentioned above is allowed to operate for count in the only period from the point in time when the shift pulse SH is produced to the point in time when the production of the count pulse CP is terminated, and to be held in the reset condition in the other period.

The above parts constitute a control portion PTCC2 for the circuits DDH, PD and PH and UP/DOWN counter UDC in the timing control circuit TTC.

Now, according to the timing control circuit TTC shown in FIG. 5, the signal integration and storing cycle of the solid state image sensing device SP is controlled always to an integer multiple of 50 msec. regardless of whether the signal integration time is longer or shorter. The phenomenon of variation of the output signal of the solid state image sensing device SP due to the flickering of the illumination device, however, prominently takes place when the signal integration time is very short, for example shorter than the period of flickering of the illumination device. In the case where the signal integration time is longer than the flicker period of the illumination device, the influence by the flickering of the illumination device is almost negligible. Therefore, from such standpoint, the above-described control of the signal integration and storing operation of the solid state image sensing device SP, that is, such control as to make its cycle coincident with an integer multiple of 50 msec. may be rendered effective only when the signal integration time becomes very short.

Figure 6:
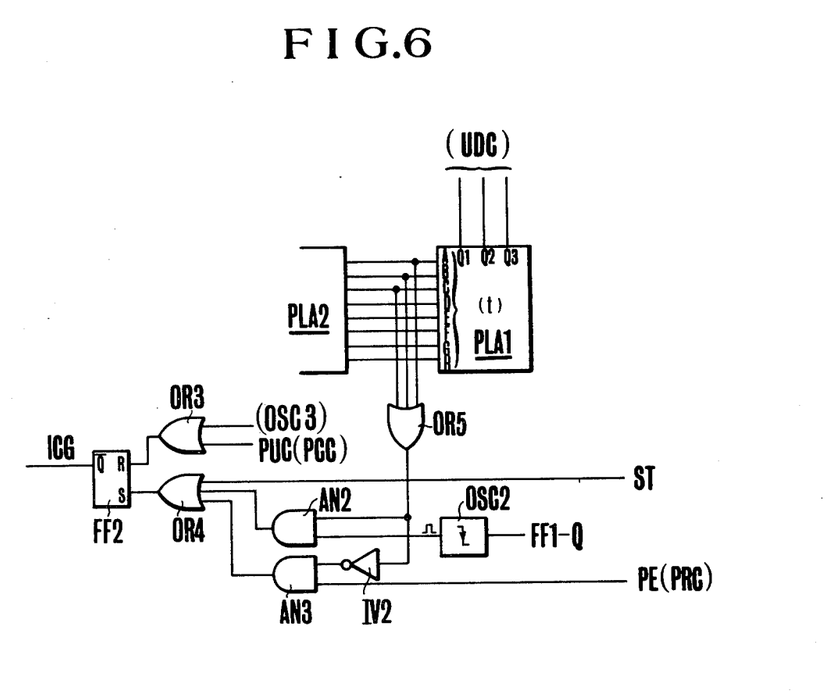
FIG. 6 is a fragmentary circuit diagram, partly in block form, showing those of the parts of an example of modification of the timing control circuit of FIG. 5 which are different in construction and arrangement from those shown in FIG. 5

Therefore, at last, from this standpoint, an example of variation of the above-described timing control circuit TCC will be described by reference to FIG. 6. The example shown in that figure is to perform the control of the signal integration and storing cycle of the solid state image sensing device SP to coincide with 50 msec. only when the signal integration time is set at either one of $t_A$, $t_B$ and $t_C$. That is, in the figure, OR5 is an OR gate for taking the logic sum of the outputs A, B, C of the programmable logic array PLA; AN2 is an AND gate for taking the logic product of the output of the said OR gate OR5 and the output of the one-shot circuit OSC2; AN3 is an AND gate for taking the logic product of the output of an inverter IV2 which inverts the output of the OR gate OR5 and the signal processing termination pulse PE from the signal processing circuit PRC. The outputs of these AND gates AN2 and AN3 are applied together with the start trigger pulse to an OR gate OR4. Except the above, it is exactly the same construction as that shown in FIG. 5.

With such system, when the signal integration time is set at either one of $t_A$, $t_B$ and $t_C$, the output of the OR gate OR5 is high and the AND gate AN2 is enabled while the AND gate AN3 is disabled. Therefore, by the output of AND gate AN2, in a similar manner to that described in connection with FIG. 5, the signal integration and storing cycle of the solid state image sensing device SP is controlled to an integer multiple of 50 msec. based on the output pulses of the one-shot circuit OSC2. But on the other hand, when the signal integration time is set at any one of $t_D$–$t_H$, the output of the OR gate OR5 is low and the AND gate AN3 is enabled while the AND gate AN2 is disabled. Therefore, by the output of the AND gate AN3, the signal integration and storing cycle of the solid state image sensing device SP is controlled based on the signal processing termination pulse PE from the signal processing circuit PRC.

What is claimed is:

1. A device comprising:
   integration and storing type radiation sensing means responsive to radiation incident thereon and arranged to produce and store an electrical indication corresponding to integration of said incident radiation during an integration time; and
   control means for controlling the integration and storing operation of said sensing means, said control means controlling the integration and storing operation of the sensing means so as to make the time interval between each of the starts of the integration and storing operations of the sensing means coincident with a time interval of an integer multiple of about 50 milliseconds.

2. The device accrding to claim 1, wherein said control means includes:
   a timing circuit for producing a predetermined timing signal of about 50 milliseconds; and
   a control circuit for controlling the integration and storing operations of the sensing means on the basis of said timing signal produced from said timing circuits so that the time interval between each of the starts of the integration and storing operations of the sensing means is made equal to an integer multiple ao about 50 milliseconds.

3. A device comprising:
   integration and storing type radiation sensing means responsive to radiation incident thereon and arranged to produce and store an electrical indication corresponding to integration of said incident radiation during an integration time;
   control means for controlling the integration and storing operation of said sensing means, said control means controlling the integration and storing operation of the sensing means so as to make the time interval between each of the starts of the integration and storing operations of the sensing means coincident with a time interval of an integer multiple of about 50 milliseconds;
   integration time setting means for setting the integration time of the sensing means among a plurality of different times;
   wherein said control means includes:
   a timing circuit for producing a predetermined timing signal of about 50 milliseconds; and
   a control circuit for controlling the integration and storing operations of the sensing means on the basis of said timing signal produced from said timing circuits so that the time interval between each of the starts of the integration and storing operations of the sensing means is made equal to an integer multiple of about 50 milliseconds;
   wherein said control means further includes a discriminating circuit for discriminating which integration time is to be set by said time setting means, said discriminating circuit producing a characteristic output when the integration time is set at a relatively short value; said control circuit being responsive to the characteristic output of said discriminating circuit and arranged to control the integration and storing operation of the sensing means in such a manner that only when the integration time is set at a relatively short value, the time interval between each of the starts of the integration and storing operations of the sensing means is made equal to an integer multiple of about 50 milliseconds.

4. A device comprising:
   integration and storing type radiation sensing means responsive to radiation incident thereon and arranged to produce and store an electrical indication corresponding to integration of said incident radiation during an integration time;
   control means for controlling the integration and storing operation of said sensing means, said control means controlling the integration and storing operation of the sensing means so as to make the time interval between each of the starts of the integration and storing operations of the sensing means coincident with a time interval of an integer multiple of about 50 milliseconds;
   integration time setting means for setting the integration time of the sensing means among a plurality of different times; and
   wherein said control means includes a discriminating circuit for discriminating which integration time is to be set by said time setting means, said discriminating circuit producing a characteristic output when the integration time is set at a relatively short value; and a control circuit responsive to the characteristic output of said discriminating circuit and arranged to control the integration and storing operation of the sensing means in such a manner that only when the signal integration time is set at a relatively short value, the time interval between each of the starts of the integration and storing operations of the sensing means is made equal to an integer multiple of about 50 milliseconds.

5. A device comprising:
   signal integration type radiation sensing means producing electrical signals corresponding to an integration of incident radiation over an integration time;
   storing means for storing the electrical signals produced by said sensing means; and
   control means for controlling the production of the electrical signals by said sensing means, said control means controlling said integration time on the basis of the intensity of said incident radiation and further controlling the supply of the electrical signals from said sensing means to said storing means in such a manner that the electrical signals produced by the sensing means are supplied to the storing means at a time interval of an integer multiple of about 50 milliseconds.

* * * * *